United States Patent
Ohji et al.

(10) Patent No.: US 6,764,974 B2
(45) Date of Patent: Jul. 20, 2004

(54) REACTION SYNTHESIS OF SILICON CARBIDE-BORON NITRIDE COMPOSITES

(75) Inventors: Tatsuki Ohji, Aichi (JP); Guo-Jun Zhang, Aichi (JP)

(73) Assignee: Japan as represented by Secretary of Agency of Industrial Science and Technology, Tokyo (JP)

(*) Notice: Subject to any disclaimer, the term of this patent is extended or adjusted under 35 U.S.C. 154(b) by 0 days.

(21) Appl. No.: 10/449,770

(22) Filed: Jun. 2, 2003

(65) Prior Publication Data

US 2003/0211930 A1 Nov. 13, 2003

Related U.S. Application Data

(62) Division of application No. 09/747,939, filed on Dec. 27, 2000, now abandoned.

(30) Foreign Application Priority Data

Jun. 16, 2000 (JP) ......................................... 2000-180931

(51) Int. Cl.$^7$ .................. C04B 35/573; C04B 35/5835; C04B 35/591
(52) U.S. Cl. ....................... 501/92; 501/96.1; 501/97.4; 264/658; 264/659; 264/682
(58) Field of Search ........................ 501/92, 96.4, 97.4; 264/658, 659, 682

(56) References Cited

U.S. PATENT DOCUMENTS

| | | | | |
|---|---|---|---|---|
| 4,080,415 A | * | 3/1978 | Coppola et al. | 264/674 |
| 4,135,938 A | * | 1/1979 | Murata et al. | 501/92 |
| 4,701,427 A | * | 10/1987 | Boecker et al. | 501/92 |

FOREIGN PATENT DOCUMENTS

| | | | | |
|---|---|---|---|---|
| JP | 3-150267 | * | 6/1991 | |
| JP | 2000-264741 | * | 9/2000 | |

OTHER PUBLICATIONS

Guo–Jun Zhang, et al., "Effect of BN content on elastic modulus and bending strength of SiC–BN in situ composites", J. Mater. Res., vol. 15, No. 9, Sep. 2000, pp. 1876–1880.*

* cited by examiner

*Primary Examiner*—Karl Group
(74) *Attorney, Agent, or Firm*—Oblon, Spivak, McClelland, Maier & Neustadt, P.C.

(57) ABSTRACT

The present invention relates to a silicon carbide-boron nitride composite material, which synthesised according to an in-situ chemical reaction between silicon nitride, boron carbide and carbon, and which contains fine boron nitride particles dispersed in a silicon carbide matrix, wherein aforementioned composite material is obtained by molding a powder mixture containing each of the components required in the in-situ reaction and sintering the mixture.

22 Claims, No Drawings

REACTION SYNTHESIS OF SILICON CARBIDE-BORON NITRIDE COMPOSITES

This application is a Division of application Ser. No. 09/747,939 Filed on Dec. 27, 2000, now abandoned.

BACKGROUND OF THE INVENTION

1. Field of the Invention

The present invention relates to a silicon carbide-boron nitride composite material comprising silicon carbide-boron nitride or silicon carbide-silicon nitride-boron nitride, obtained through an in-situ chemical reaction of same, and to a method for the manufacture of same, and in particular relates to the manufacturing and thereby providing of silicon carbide-boron nitride composite materials in which very fine boron nitride particles have been uniformly dispersed in a silicon carbide matrix, by utilising an in-situ chemical reaction between silicon nitride, boron carbide and carbon.

The present invention relates to a novel material which displays exceptional strength and corrosion resistance and which has a low elastic modulus and provides a material which can be utilised in such diverse applications as thermal shock resistant materials, mechanical shock resistant materials, heat resistant materials or corrosion resistant materials.

2. Description of the Related Art

Due to its exceptional resistance to oxidation and heat, silicon carbide is known as a sinter material containing silicon nitride, aluminium nitride, boron nitride and titanium boride as additives, as disclosed in U.S. Pat. No. 4,304,870, for example.

Due to their exceptional resistance to oxidation and corrosion, these materials are used as heat-resistant materials in air furnaces, and it is expected that as their properties are enhanced, their range of application will accordingly expand. The addition of boron nitride in particular allows the thermal shock resistance of the resulting composite material to be significantly enhanced, leading to anticipated applications in such fields as aircraft engine or gas turbine components.

Silicon carbide-boron nitride composite materials have conventionally been manufactured by mixing presynthesised silicon carbide and boron nitride powder using a mechanical method, then hot-pressing etc. the resulting mixture. With this method, however, the coarser the boron nitride powder is, the coarser the boron nitride particles will be in the resulting composite material. Due to boron nitride exhibiting a high anisotropy of thermal expansion, cracks tend to form along boundary surfaces; therefore, the larger the particles are, the less strength the composite materials will have.

Accordingly, boron nitride powder is preferable due to it being a fine powder; however, such fine powders are expensive and moreover it is difficult to eliminate the coarse powder completely.

With the foregoing problems with the prior art in view, the inventors of the present invention attempted to develop a new composite material, and a method for the manufacture of same, with which it is possible to eliminate completely the drawbacks with the aforementioned method, and having conducted diligent research in regard to the manufacture of composite ceramic materials utilising an in-situ chemical reaction discovered that silicon carbide-boron nitride composite materials can be manufactured by utilising an in-situ chemical reaction between silicon nitride, boron carbide and carbon and conducting a hot-press process on a powder mixture containing silicon nitride, boron carbide and carbon, involving a controlled rate of temperature increase. The inventors further discovered that an even finer material could be manufactured, which contained no air pockets, by further adding a sinter auxiliary such as alumina or yttria, and perfected the present invention based on these findings.

SUMMARY OF THE INVENTION

It is an object of the present invention to provide, by utilising a simple in-situ chemical reaction, a method for manufacturing a silicon carbide-boron nitride composite material, and the composite material itself, which when compared with composites manufactured using traditional methods exhibits a finer structure, higher density, higher strength, lower elastic modulus and higher fracture toughness. The present invention relates to a silicon carbide-boron nitride composite material, which synthesised according to an in-situ chemical reaction between silicon nitride, boron carbide and carbon, and which contains fine boron nitride particles dispersed in a silicon carbide matrix, wherein aforementioned composite material is obtained by molding a powder mixture containing each of the components required in the in-situ reaction and sintering the mixture; and is a method for manufacturing the aforementioned material, wherein aforementioned method for manufacturing the silicon carbide-boron nitride composite material comprises molding a powder in which each component which is required in the in-situ chemical reaction between silicon carbide, boron nitride and carbon is admixed, and, as required, at least one component selected from among silicon carbide, boron nitride or silicon nitride is further added thereinto and the mixture is sintered to obtain the composite.

DETAILED DESCRIPTION OF THE INVENTION

It is an object of the present invention to manufacture, and thereby to provide, a silicon carbide-boron nitride composite material in which very fine boron nitride particles have been uniformly dispersed in a silicon carbide matrix, by means of an in-situ chemical reaction.

It is a further object of the present invention to manufacture, and thereby to provide, a silicon carbide-silicon nitride-boron nitride composite material by utilising an in-situ chemical reaction between silicon nitride, boron carbide and carbon.

The present invention, in resolving the aforementioned drawbacks, comprises the technical means below.

(1) A silicon carbide-boron nitride composite material with fine boron nitride particles uniformly dispersed in a silicon carbide matrix, which synthesised according to an in-situ chemical reaction between silicon nitride, boron carbide and carbon,
said silicon carbide-boron nitride composite material is produced by molding a powder mixture containing the said components which are required in the in-situ chemical reaction, and sintering the molded mixture to obtain the sintered composite.

(2) A silicon carbide-boron nitride composite material, which synthesised according to an in-situ chemical reaction between at least silicon nitride, boron carbide and carbon,
said silicon carbide-boron nitride composite material is produced by molding a powder comprising a silicon carbide, boron nitride or silicon nitride powder being added to a powder mixture containing the said components which are required in the in-situ chemical reaction between silicon nitride, boron carbide and carbon, and sintering the molded mixture to obtain the sintered composite comprising silicon carbide-boron nitride or silicon carbide-silicon nitride-boron nitride in which the phase composition is adjusted as required.

(3) A silicon carbide-boron nitride composite material, which synthesised according to an in-situ chemical reaction between at least silicon nitride, boron carbide and carbon,
said silicon carbide-boron nitride composite material is produced by molding a powder comprising a silicon carbide or boron nitride powder being added to a powder mixture containing the said components which are required in an in-situ chemical reaction between silicon nitride, boron carbide and carbon, and sintering the molded mixture to obtain the sintered composite in which the phase composition is adjusted as required.

(4) A method for manufacturing the composite material defined in any one of (1) through (3) above, which comprises mixing the components which are required in an in-situ chemical reaction between silicon nitride, boron carbide and carbon, adding further as required, at least one component selected from among silicon carbide, boron nitride or silicon nitride thereinto, molding the mixture, and sintering the molded mixture to manufacture a silicon carbide-boron nitride composite material or a silicon carbide-silicon nitride-boron nitride composite material.

DESCRIPTION OF THE PREFERRED EMBODIMENTS

The present invention shall now be described in further detail.

According to the present invention, as has been detailed in the foregoing, a silicon carbide-boron nitride composite material, in which very fine boron nitride particles have been uniformly dispersed in a silicon carbide matrix, by means of an in-situ chemical reaction between silicon nitride, boron carbide and carbon, is manufactured and thereby provided.

In the present invention, in other words, the uniform dispersing of the fine boron nitride particles by means of an in-situ chemical reaction of same enables fracture toughness to be enhanced, while significantly lowering the elastic modulus, without causing the strength of the resulting silicon carbide-boron nitride composite material to diminish.

To provide a more detailed explanation, silicon carbide-boron nitride composite materials can be manufactured with the present invention according to the following chemical reaction:

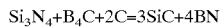

$$Si_3N_4+B_4C+2C=3SiC+4BN$$

In the present invention, the composite material synthesised according to the in-situ chemical reaction between silicon nitride, boron carbide and carbon shall be defined to be a composite material that has been synthesised according to the aforesaid chemical reaction.

The phase composition obtained from this chemical reaction is 46.29 vol % silicon carbide and 53.71 vol % boron nitride. If the amount of silicon nitride added in such circumstances is greater than the stoichiometric composition; i.e., is added in excess, a silicon carbide-silicon nitride-boron nitride composite material shall be obtained. In the present invention, it is possible to produce silicon carbide-silicon nitride-boron nitride composite materials by adding an amount of silicon nitride which is in excess of the stoichiometric composition of the aforesaid chemical reaction.

A silicon carbide-boron nitride composite material in which the phase composition has been adjusted to the required level can be manufactured by further adding silicon carbide or boron nitride powder to a powder mixture containing each component in the aforesaid chemical reaction. Moreover, a silicon carbide-silicon nitride-boron nitride composite material with the desired phase composition can be manufactured by further adding a silicon carbide, boron nitride or silicon nitride powder.

In the present invention, essentially, each component required in the in-situ chemical reaction between silicon nitride, boron carbide and carbon are mixed, whereupon the mixture is moulded and sintered; however, it is possible to manufacture silicon carbide-boron nitride composite materials or silicon carbide-silicon nitride-boron nitride composite materials, in which the phase composition has been adjusted as required, by moulding and sintering a powder that contains at least one component selected from among silicon carbide, boron nitride or silicon nitride, and that has been added, as required, to the powder mixture containing each component.

In the present invention, it is preferable for e.g. an α-type silicon nitride powder of a mean particle diameter of 0.5 $\mu$ to be used as the silicon nitride in the material; for e.g. a boron carbide powder of a mean particle diameter of 1 $\mu$ to be used as the boron carbide; for e.g. an α-type silicon carbide powder of a mean particle diameter of 0.6 $\mu$ to be used as the silicon carbide; and for e.g. a carbon powder of a mean particle diameter of 0.01 $\mu$ to be used as the carbon; however, the invention is not limited to the above. These materials can be mixed into a powder mixture using a ball mill. Hot-pressing can be used to mould and sinter the powder mixture into the desired form. The hot-pressing is preferably carried out under a pressure of 10 to 50 MPa in an inert gas atmosphere of e.g. argon gas, preferably utilising e.g., the in-situ chemical reaction between silicon nitride, boron carbide and carbon.

In conducting the above, alumina, yttria, magnesia, ytterbia, zirconia, silica, lutetia, ceria, scandia or another sintering auxiliary can be preferably added to yield a fine composite material containing no air pockets.

In the present invention, a silicon carbide-boron nitride composite material is synthesised by moulding and sintering a powder mixture containing each component, utilising the in-situ chemical reaction between silicon nitride, boron carbide and carbon; accordingly, using an uncomplicated process it is possible to manufacture a silicon carbide-boron nitride composite material, in which very fine boron nitride particles have been uniformly dispersed in a silicon carbide matrix.

Function

In the past, silicon carbide-boron nitride composite materials have been manufactured by mixing pre-synthesised silicon carbide and boron nitride powders by means of a mechanical method and then e.g., hot-pressing the mixture. However, the coarser the boron nitride powder is, the coarser the boron nitride particles will be in the resulting composite materials, and the less strength the composite materials will have. On the other hand, fine boron nitride powder is expensive and moreover it is technically difficult to eliminate the coarse powder completely.

According to the method pertaining to the present invention, which utilises an in-situ chemical reaction between silicon nitride, boron carbide and carbon, it is possible to manufacture a silicon carbide-boron nitride composite material with an uncomplicated process, in which very fine boron nitride particles have been uniformly dispersed in a silicon carbide matrix. Therefore, fracture toughness can be enhanced and the elastic modulus significantly lowered, without causing the strength of the silicon carbide-boron nitride composite material to diminish. It is therefore possible to manufacture silicon carbide-boron nitride composites which exhibit high performance, inexpensively.

EXAMPLES

The present invention shall be described in further detail with reference to working examples. The present invention shall in no way be limited to these examples.

EXAMPLES (1) Composition of Raw Material

Tests in the present working examples were conducted on powders containing each of the raw material components as given in Table 1.

(2) Method

The materials used for the present invention and for comparative examples were manufactured by mixing powders containing each of the aforesaid raw material components, then applying a known moulding and sintering method, such as hot-pressing, to the resulting mixtures. Taking B55 in Table 1 as an example, approximately 60 wt % silicon nitride, 24 wt % boron carbide, 10 wt % carbon, 4 wt % alumina and 2 wt % yttria were mixed together, and the resulting mixture was hot-pressed for one hour at 2000° C. to yield a fine material free of air pockets.

(3) Results

The strength, elastic moduli and fracture toughness values of the materials were respectively assessed using a three-point bending strength testing method in accordance with JIS R1601, an ultrasonic pulse method in accordance with JIS R1602 and an IF method in accordance with JIS R1607. The results of the measurements were a three-point bending strength of approximately 350 MPa, an elastic modulus of 107 GPa and a fracture toughness value of 6.7 MPam$^{1/2}$. This working example is represented as B55 in Table 1, and the other working examples are also represented in Table 1, all having been tested using the same methods as described above.

TABLE 1-1

| Sample No. | Composition of raw material (wt %) | Phase composition of resulting material (vol %) | Hot-pressing temperature (° C.) | Bending strength (MPa) | Elastic modulus (GPa) | Fracture toughness (MPam$^{1/2}$) |
|---|---|---|---|---|---|---|
| B0 | 90 silicon carbide<br>7 Al$_2$O$_3$<br>3 Y$_2$O$_3$ | 100 silicon carbide | 2000 | 620 | 427 | 4 |
| B5 | 83.1 silicon carbide<br>4.6 silicon nitride<br>1.8 boron carbide<br>0.8 carbon<br>6.8 Al$_2$O$_3$<br>2.9 Y$_2$O$_3$ | 95 silicon carbide<br>5 boron nitride | 2000 | 675 | 370 | — |
| B15 | 68.6 silicon carbide<br>14.3 silicon nitride<br>5.7 boron carbide<br>2.5 carbon<br>6.3 Al$_2$O$_3$<br>2.7 Y$_2$O$_3$ | 85 silicon carbide<br>15 boron nitride | 2000 | 647 | 295 | — |
| B25 | 53.3 silicon carbide<br>25.1 silicon nitride<br>9.9 boron carbide<br>4.3 carbon<br>5.2 Al$_2$O$_3$<br>2.2 Y$_2$O$_3$ | 75 silicon carbide<br>25 boron nitride | 2000 | 588 | 240 | 6.7 |
| B35 | 35.9 silicon carbide<br>36.2 silicon nitride<br>14.3 boron carbide<br>6.2 carbon<br>5.2 Al$_2$O$_3$<br>2.2 Y$_2$O$_3$ | 65 silicon carbide<br>35 boron nitride | 2000 | 582 | 174 | — |

TABLE 1-2

| Sample No. | Composition of raw material (wt %) | Phase composition of resulting material (vol %) | Hot-pressing temperature (° C.) | Bending strength (MPa) | Elastic modulus (GPa) | Fracture toughness (MPam$^{1/2}$) |
|---|---|---|---|---|---|---|
| B45 | 17.4 silicon carbide<br>48.6 silicon nitride<br>19.1 boron carbide<br>8.3 carbon<br>7 Al$_2$O$_3$<br>3 Y$_2$O$_3$ | 55 silicon carbide<br>45 boron nitride | 2000 | 471 | 127 | — |

TABLE 1-2-continued

| Sample No. | Composition of raw material (wt %) | | Phase composition of resulting material (vol %) | | Hot-pressing temperature (° C.) | Bending strength (MPa) | Elastic modulus (GPa) | Fracture toughness (MPam$^{1/2}$) |
|---|---|---|---|---|---|---|---|---|
| B55 | 60.2 | silicon nitride | 46.29 | silicon carbide | 2000 | 342 | 107 | 6 |
| | 23.7 | boron carbide | 53.71 | boron nitride | | | | |
| | 10.3 | carbon | | | | | | |
| | 4 | Al$_2$O$_3$ | | | | | | |
| | 1.7 | Y$_2$O$_3$ | | | | | | |
| carbon 25 | 51.6 | silicon carbide | 75 | silicon carbide | 2000 | 420 | 217 | 5 |
| | 42.6 | boron nitride | 25 | boron nitride | | | | |
| | 4 | Al$_2$O$_3$ | | | | | | |
| | 1.7 | Y$_2$O$_3$ | | | | | | |
| carbon 55 | 74.8 | silicon carbide | 46.29 | silicon carbide | 2000 | 246 | 81 | — |
| | 17.7 | boron nitride | 53.71 | boron nitride | | | | |
| | 5.2 | Al$_2$O$_3$ | | | | | | |
| | 2.2 | Y$_2$O$_3$ | | | | | | |

Comparative Example

B0, carbon 55 and carbon 25 are given in Table 1 as comparative examples. Among these, the hot-pressed sintered articles produced from silicon carbide-boron nitride powder mixtures displayed a three-point bending strength of approximately 250 MPa and a fracture toughness of 5 MPam$^{1/2}$, which were recognised as coming substantially below the values for all of the working examples.

As has been described in the foregoing, the present invention relates to a silicon carbide-boron nitride composite material, which is obtained in accordance with an in-situ chemical reaction between silicon nitride, boron carbide and carbon, by moulding and sintering a powdered mixture containing each component, and a method for the manufacture of same. According to the present invention, the following exceptional merits can be obtained: 1) it is possible to manufacture and thereby to provide a silicon carbide-boron nitride composite material in which very fine boron nitride particles have been uniformly dispersed in a silicon carbide matrix; 2) using an uncomplicated process it is possible to obtain a silicon carbide-boron nitride composite material which exhibits high strength, a low elastic modulus, and high fracture toughness at room temperature, by utilising an in-situ chemical reaction between silicon nitride, boron carbide and carbon, mixing each component powder together and then hot-pressing the mixture; and 3) it is possible to manufacture a silicon carbide-boron nitride composite material of high performance, inexpensively.

What is claimed is:

1. A method for making a composite material comprising:
   mixing silicon nitride, boron carbide and carbon thus forming a mixture,
   molding the mixture, and
   sintering the molded mixture to provide a silicon carbide-boron nitride composite material or a silicon carbide-silicon nitride-boron nitride composite material.

2. The method of claim 1, which comprises mixing stoichiometric amounts of silicon nitride, boron carbide and carbon in accordance with the following reaction formula:

Si$_3$N$_4$+B$_4$C+2C=3SiC+4BN.

3. The method of claim 1, wherein a greater than stoichiometric amount (excess) of silicon nitride is mixed with boron carbide and carbon in accordance with the following reaction formula:

Si$_3$N$_4$+B$_4$C+2C=3SiC+4BN.

4. The method of claim 1, further comprising adding at least one component selected from the group consisting of silicon carbide, and boron nitride, to said mixture prior to molding and sintering.

5. The method of claim 4, further comprising adding silicon carbide to said mixture prior to molding and sintering.

6. The method of claim 4, further comprising adding boron nitride to said mixture prior to molding and sintering.

7. The method of claim 1, wherein said molded and sintered composite material consists essentially of silicon carbide-boron nitride, and optionally one or more sintering auxiliaries.

8. The method of claim 1, wherein said molded and sintered composite material consists essentially of silicon carbide-silicon nitride-boron nitride, and optionally one or more sintering auxiliaries.

9. The method of claim 1, wherein said molded and sintered composite material comprises very fine boron nitride particles uniformly dispersed in a silicon carbide matrix.

10. The method of claim 1, wherein said molded and sintered composite material is free of air pockets.

11. The method of claim 1, further comprising adding one or more sintering auxiliaries to said mixture.

12. The method of claim 1, further comprising adding to said mixture one or more sintering auxiliaries selected from the group consisting of ytterbia, zirconia, silica, lutetia, ceria, and scandia.

13. The method of claim 1, further comprising adding to said mixture Al$_2$O$_3$.

14. The method of claim 1, further comprising adding to said mixture Y$_2$O$_3$.

15. The method of claim 1, further comprising adding to said mixture Al$_2$O$_3$ and Y$_2$O$_3$.

16. The method of claim 1, wherein said mixture comprises an α-type silicon nitride powder.

17. The method of claim 1, wherein said mixture comprises boron carbide powder.

18. The method of claim 1, wherein said mixture comprises a carbon powder.

19. The method of claim 1, wherein said mixture comprises an α-type silicon carbide powder.

20. The method of claim 1, wherein said mixing is performed with a ball mill.

21. The method of claim 1, wherein said molding and sintering is performed by hot pressing.

22. The method of claim 1, wherein said molding and sintering is performed by hot pressing under a pressure of 10 to 50 MPa in an inert gas atmosphere.

* * * * *